(12) United States Patent
Kennedy et al.

(10) Patent No.: US 11,204,050 B2
(45) Date of Patent: Dec. 21, 2021

(54) FLEXIBLE BRACKET FOR JOINT STRUCTURE ASSEMBLY

(71) Applicant: Stance Healthcare Inc., Kitchener (CA)

(72) Inventors: Bruce Kennedy, Kitchener (CA); Randy Price, Jordan, MN (US)

(73) Assignee: Stance Healthcare Inc, Kitchener (CA)

( * ) Notice: Subject to any disclaimer, the term of this patent is extended or adjusted under 35 U.S.C. 154(b) by 325 days.

(21) Appl. No.: 16/360,181

(22) Filed: Mar. 21, 2019

(65) Prior Publication Data

US 2019/0301503 A1 Oct. 3, 2019

Related U.S. Application Data

(60) Provisional application No. 62/649,675, filed on Mar. 29, 2018.

(51) Int. Cl.
| | |
|---|---|
| *F16B 21/09* | (2006.01) |
| *F16B 12/10* | (2006.01) |
| *A47C 7/54* | (2006.01) |
| *F16B 12/56* | (2006.01) |

(52) U.S. Cl.
CPC .............. *F16B 12/10* (2013.01); *A47C 7/541* (2018.08); *F16B 12/56* (2013.01); *F16B 2012/103* (2013.01)

(58) Field of Classification Search
CPC .......... F16B 21/09; F16B 12/00; F16B 12/10; F16B 12/20; F16B 12/22; A47C 7/541; A47B 13/003; A47B 95/008
See application file for complete search history.

(56) References Cited

U.S. PATENT DOCUMENTS

| | | | |
|---|---|---|---|
| 1,533,724 A | 4/1925 | Henry |
| 2,477,575 A | 8/1949 | Bubser |
| 2,994,888 A | 8/1961 | Egidio |
| 3,239,988 A | 3/1966 | Meyer |
| 3,491,820 A | 1/1970 | Ostling |
| 3,634,983 A | 1/1972 | Welch |

(Continued)

FOREIGN PATENT DOCUMENTS

FR 1544058 A 10/1968

*Primary Examiner* — Daniel J Wiley
(74) *Attorney, Agent, or Firm* — Own Innovation; James W. Hinton

(57) ABSTRACT

A flexible bracket for forming a joint assembly between two furniture members includes a fastener head seat, a first arm extending laterally of the fastener head seat in a first direction and a second arm extending laterally of the fastener head seat in a second direction. The first and second arms each have valley portions adjacent the fastener head seat and distal portions laterally outward of the valley portions. The valley portions are disposed below the plane of the fastener head seat while distal portions are disposed above the fastener head seat. The flexible bracket also includes a slotted aperture having a head receiving portion and a slot portion, the slot portion dimensioned to enable a head of a headed fastener to slide within the slot portion from the fastener head receiving portion to the fastener head seat without disengaging the slot portion. The first arm valley portion impedes the head of the headed fastener from exiting the fastener head seat.

20 Claims, 6 Drawing Sheets

(56) References Cited

U.S. PATENT DOCUMENTS

| | | | |
|---|---|---|---|
| 3,645,162 A * | 2/1972 | Welch | F16B 5/0036 |
| | | | 411/339 |
| 3,814,491 A | 6/1974 | Kackley | |
| 3,894,377 A | 7/1975 | Welch | |
| 3,996,718 A * | 12/1976 | Welch | F16B 12/22 |
| | | | 312/111 |
| 4,056,275 A | 11/1977 | Keeler | |
| 4,178,047 A | 12/1979 | Welch | |
| 4,434,900 A | 3/1984 | Cook | |
| 4,470,716 A | 9/1984 | Welch | |
| 4,473,316 A | 9/1984 | Welch | |
| 4,571,790 A * | 2/1986 | James, III | A61G 17/0407 |
| | | | 27/10 |
| 4,642,963 A | 2/1987 | Borges | |
| 4,878,639 A | 11/1989 | Tempco | |
| 4,881,844 A | 11/1989 | Tremblay | |
| 5,024,409 A | 6/1991 | Bohnen | |
| 5,420,762 A | 5/1995 | Lewis | |
| 5,653,009 A | 8/1997 | Kassardjian | |
| 5,778,804 A * | 7/1998 | Read | A47B 13/021 |
| | | | 248/221.12 |
| 6,109,819 A | 8/2000 | Welch | |
| 6,588,971 B2 | 7/2003 | Welch et al. | |
| 6,854,946 B2 | 2/2005 | Bauer | |
| 2006/0226618 A1 | 10/2006 | Marklevitz et al. | |
| 2010/0166494 A1 | 7/2010 | Cochard | |

* cited by examiner

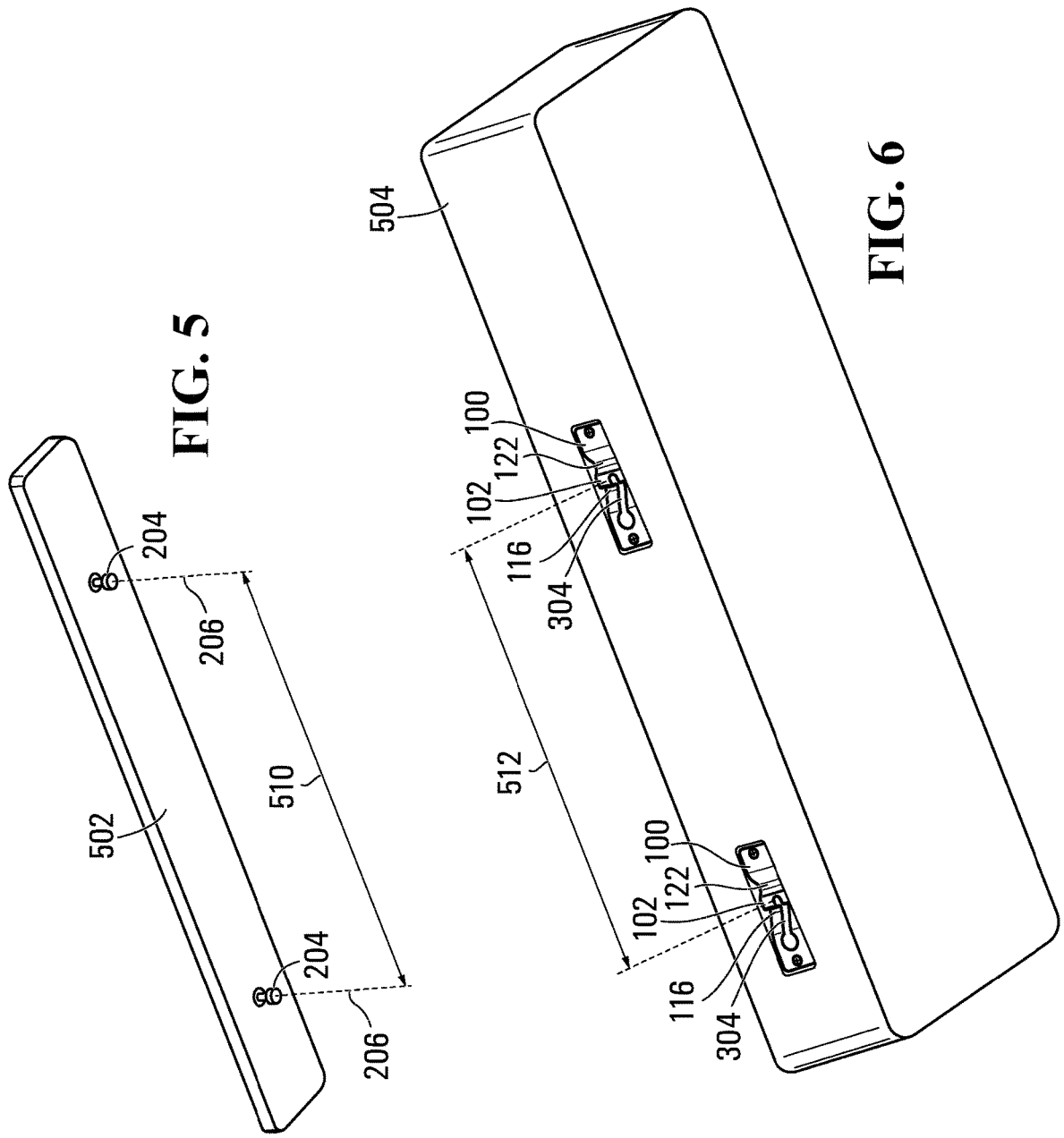

FLEXIBLE BRACKET FOR JOINT STRUCTURE ASSEMBLY

TECHNICAL FIELD

The embodiments disclosed herein relate to a flexible bracket and in particular, to a joint structure assembly using the flexible bracket to join two parts.

INTRODUCTION

Various types of joint assemblies between furniture parts, such as cabinets, shelving units, chairs and tables are known. Some of these joint assemblies feature a concealed bracket and fastener in which the bracket includes a keyhole slot dimensioned to receive the head of the fastener. Nonetheless, there remains a need for an improved bracket for the joint assembly.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with an aspect of this disclosure, there is provided a joint structure assembly. The joint structure assembly includes a first member having a first contacting surface, a second member having a second contacting surface, at least one headed fastener and at least one flexible bracket for joining the first member to the second member. The second contacting surface has at least one recessed area. The at least one headed fastener has a head and a longitudinal axis running through its centre. The at least one headed fastener is secured to the first contacting surface of the first member such that the longitudinal axis is substantially orthogonal to the first contacting surface and the head of the at least one headed fastener is spaced from the first contacting surface. The at least one flexible bracket is secured to the second contacting surface of the second member. The at least of flexible bracket includes:

(a) a fastener head seat positioned in a plane, the fastener head seat having a first seat end and a second seat end laterally opposed of the first seat end;

(b) a first arm extending laterally outward of the first seat end, the first arm having a first arm valley portion adjacent the fastener head seat and a first arm distal portion positioned laterally outward the first arm valley portion, the first arm valley portion being disposed below the plane of the fastener head seat, the first arm distal portion being disposed above the plane of the fastener head seat;

(c) a second arm extending laterally outward of the second seat end, the second arm having a second arm valley portion adjacent the fastener head seat and a second arm distal portion laterally outward the second arm valley portion; and (d) a slotted aperture having a slot portion and a fastener head receiving portion, the slot portion extending laterally outward from the fastener head seat to the fastener head receiving portion positioned on the first arm, the fastener head receiving portion being dimensioned to enable the head of the at least one headed fastener to pass therethrough, the slot portion being dimensioned to enable the head of the at least one headed fastener to slide within the slot portion between the fastener head receiving portion and the fastener head seat without disengaging the slot portion, wherein the first arm distal portion and the second distal arm portion are secured to the second contacting surface such that first arm valley portion, the fastener head seat and the second arm valley portion are contained within the at least one recessed area of the second contacting surface;

The first member is joined with the second member when the head of the at least one headed fastener is positioned at the fastener head seat within the slot portion of the slotted aperture. In this position, the first arm valley portion impedes the head of the at least one headed fastener from exiting the fastener head seat.

In a feature of this aspect, i) an underside of the head of the at least one headed fastener is spaced from the first contacting surface by a head separation distance, and ii) the plane of the fastener head seat of the at least one flexible bracket is spaced from the second contacting surface by a seat separation distance. The seat separation distance is smaller than the head separation distance. When the head of the at least one headed fastener is positioned at the fastener head seat within the slot portion of the slotted aperture, the first and second arms of the at least one flexible bracket are forced to flex toward from the first member. The tension in the first and second arms causes the fastener head seat to exert a holding force to the underside of the head of the at least one headed fastener, the holding force further impeding the head of the at least one headed fastener from exiting the fastener head seat.

In another feature of this aspect, a head seat length between the first seat end and second seat end of the fastener head seat corresponds to a diameter of the head of the at least one headed fastener such that when the head of the at least one headed fastener is positioned at the fastener head seat within the slot portion of the slotted aperture, the head is restrained between the first arm valley portion and the second arm valley portion of the first and second legs, respectively, to impede movement of the first member relative to the second member.

In still another feature of this aspect, the first arm distal portion and the second arm distal portion of the at least one flexible bracket are divided into planar and non-planar portions. The first arm non-planar portion connects the first arm valley portion to the first arm planar portion. The first arm planar portion is parallel to the plane of the fastener head seat. The second arm non-planar portion connects the second arm valley portion to the second arm planar portion. The second arm planar portion is parallel to the plane of the fastener head seat.

In still another feature of this aspect, when the first member is joined with the second member, the first contacting surface is flush with the second contacting surface.

In still another feature of this aspect, the first arm valley portion and the second arm second portion of the at least one flexible bracket are arcuate.

In still another feature of this aspect, the first arm distal portion and the second arm distal portion of the at least one flexible bracket are each secured to the second contacting surface of the second member by any one or more of glue, epoxy, threaded screws, and nails.

In still another feature of this aspect, the first arm planar portion and the second arm planar portion each arm comprise a throughhole. The at least one flexible bracket is secured to the second contacting surface of the second member by threaded fasteners passing through the throughholes.

In still another feature of this aspect, wherein the first arm of the at least one flexible bracket extends from the first seat end in a first arm direction and the second arm of the at least one flexible bracket extends from the second seat end in a second arm direction. The first arm direction is opposite the second arm direction.

In still another feature of this aspect, the first member is an arm cap of an armchair and the second member is a side wall of the armchair.

In accordance with another aspect of this disclosure, there is provided a flexible bracket for use in forming a joint assembly between two furniture members. The flexible bracket may be used in combination with one or more other aspects of this disclosure. The flexible bracket includes:

(a) a fastener head seat positioned in a plane, the fastener head seat having a first seat end and a second seat end laterally opposed of the first seat end;

(b) a first arm extending laterally outward of the first seat end, the first arm having an first arm valley portion adjacent the fastener head seat and a first arm distal portion positioned laterally outward the first arm valley portion, the first arm valley portion being disposed below the plane of the fastener head seat, the first arm distal portion being disposed above the plane of the fastener head seat;

(c) a second arm extending laterally outward of the second seat end, the second arm having a second arm valley portion adjacent the fastener head seat and a second arm distal portion laterally outward the second arm valley portion; and (d) a slotted aperture for receiving a head of the headed fastener, the slotted aperture having a slot portion and a fastener head receiving portion, the slot portion extending laterally outward from the fastener head seat to the fastener head receiving portion positioned on the first arm, the fastener head receiving portion being dimensioned to enable the head of the headed fastener to pass therethrough, the slot portion being dimensioned to enable the head of the headed fastener to slide within the slot portion between the fastener head receiving portion and the fastener head seat without the head of the headed fastener disengaging the slot portion.

In a feature of this aspect, when the head of the headed fastener is positioned at the fastener head seat within the slot portion of the slotted aperture, the first arm valley portion impedes the head of the headed fastener from exiting the fastener head seat.

In another feature of this aspect, when the head of the headed fastener is positioned at the fastener head seat within the slot portion of the slotted aperture, the first and second arms of the at least one flexible bracket are forced to flex. The tension in the first and second arms of the flexible bracket causes the fastener head seat to exert a holding force to the underside of the head of the headed fastener. The holding force impedes the head of the headed fastener from exiting the fastener head seat.

In still another feature of this aspect, the first arm distal portion and the second arm distal portion of the at least one flexible bracket are divided into planar and non-planar portions. The first arm non-planar portion connects the first arm valley portion to the first arm planar portion. The first arm planar portion is parallel to the plane of the fastener head seat. The second arm non-planar portion connects the second arm valley portion to the second arm planar portion. The second arm planar portion is parallel to the plane of the fastener head seat.

In still another feature of this aspect, fastener head receiving portion of the slotted aperture extends onto the first arm planar portion.

In still another feature of this aspect, a first arm elevation measured from the first arm planar to the plane of the fastener head seat in a direction orthogonal to the plane is equal to a second arm elevation measured from the second arm planar portion to plane of the fastener head seat in a direction orthogonal to the plane.

In still another feature of this aspect, the first arm planar portion and the second arm planar portion each comprise a throughhole.

In still another feature of this aspect, the first seat end and the second seat end are laterally spaced apart by a head seat length. The head seat length corresponds to a diameter of the head of the headed fastener.

In still another feature of this aspect, the first arm valley portion and the second arm valley portion are arcuate.

In still another feature of this aspect, the first arm extends from the first seat end in a first arm direction and the second arm extends from the second seat end in a second arm direction. The first arm direction is opposite the second arm direction.

In still another feature of this aspect, the fastener head seat is in the centre of the flexible bracket.

In still another feature of this aspect, a first arm length measured from first seat end to a first arm outer edge in the first arm direction is longer than a second arm length measured from the second seat end to a second arm outer edge in the second arm direction.

In still another feature of this aspect, the flexible bracket is formed of one continuous piece of spring steel.

BRIEF DESCRIPTION OF THE DRAWINGS

The drawings included herewith are for illustrating various examples of articles, methods, and apparatuses of the present specification. In the drawings:

FIG. 5 shows a bottom perspective view of an arm cap having two headed fasteners secured thereto, in accordance with an embodiment;

FIG. 6 shows a top perspective view of a side wall of an armchair having two flexible brackets secured thereto, in accordance with an embodiment.

DETAILED DESCRIPTION

Figure 1A:
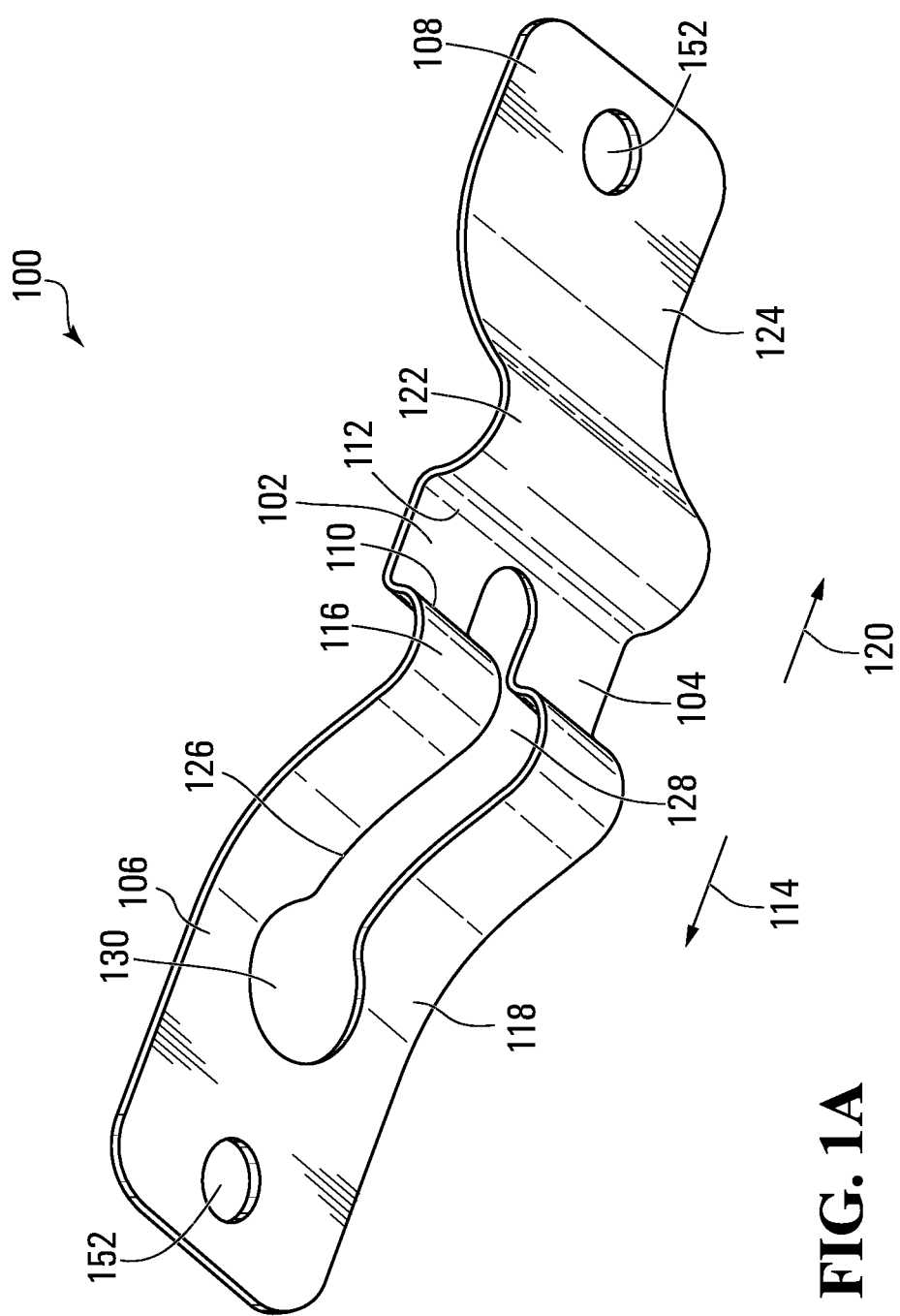
FIG. 1A shows a side perspective view of a flexible bracket, in accordance with an embodiment.

The embodiments illustrated and described herein provide individual, non-limiting, examples in which the principles of the present invention are employed. It is possible to make other embodiments that employ the principles of the invention and that fall within the following claims. To the extent that the features of those examples are not mutually exclusive of each other, the features of the various embodiments may be mixed-and-matched, i.e., combined, in such manner as may be appropriate, without having to resort to repetitive description of those features in respect of each possible combination or permutation. The invention is not limited to the specific examples or details which are given by way of illustration herein, but only by the claims, as mandated by law. The claims are to be given the benefit of purposive interpretation to include equivalents under the doctrine of equivalents.

In the description, like parts are marked throughout the specification and the drawings with the same respective reference numerals. The wording used herein is intended to include both singular and plural where such would be understood, and to include synonyms or analogous terminology to the terminology used, and to include equivalents thereof in English or in any language into which this specification many be translated, without being limited to specific words or phrases.

There are many types of concealed joint assemblies used to join furniture parts, such as cabinets, shelving units, chairs and tables. Many of these joint assemblies feature a bracket and a fastener in which the bracket includes a keyhole slot dimensioned to receive a head of the fastener.

One common type of joint assembly requires a recess to be formed along the edge of one the on the furniture parts. The bracket having the keyhole slot can be mounted within this recess. The fastener can be mounted in the other furniture part. To join the furniture parts, the head of the fastener can be passed through the recess and into the slot's entrance. Next, the fastener can be moved within the slot of the bracket until the head of the fastener reaches the securing seat. The slot may include an inclined ramp to more firmly join the furniture parts. This type of bracket can be referred to as a "non-locking" bracket. The joint assembly using the non-locking bracket can be easily disassembled by moving the fastener within the slot in a direction opposite to the direction used to join the furniture parts.

Another common type of joint assembly generally uses the same configuration as described for the non-locking joint assembly. However, the slot of the bracket may have converging side edges which form a narrowing width. This narrowing slot portion, commonly called the "throat", may open out to the securing seat or a closed end of the slot which has an increased width portion. To join the furniture parts, the fastener can be moved within the slot and, in so doing, can engage the throat to cam the sides of the slot outwardly as it travels toward the securing seat. When cleared of the throat, the sides of the bracket can return to their normal position while the fastener reaches the securing seat of the slot. This type of bracket can be referred to as a "semi-locking" bracket. The semi-locking bracket can impede disassembly without the application of a sufficient degree of force exerted on the fastener to push the fastener through the throat in the reverse direction.

Joint assemblies using the non-locking and the semi-locking brackets may experience instances in which the furniture parts are inadvertently disassembled by a user of the furniture. For example, the sufficient degree of force may be accidently exerted on the fastener to disassembly the furniture pieces by the user who is moving the furniture to another location within a room. Also, if the furniture is being used in locations where the individual furniture parts may be used as weapons, such as in a prison or a mental health facility, the non-locking and semi-locking brackets may not adequately prevent disassembly.

To prevent the drawbacks noted above, a "locking" bracket may be used. The locking bracket may include a locking flange extending in an upward direction from the base of the bracket that terminates below the slot, adjacent to the securing seat. To join the furniture parts, the head of the fastener can engage the slot and depress the locking flange towards the base of the bracket as it moves with the slot toward the securing seat. When positioned in the securing seat, the head of the fastener may pass beyond the locking flange which has resiliently returned to its original position. In this original position, the end of the locking flange may be positioned immediately adjacent to the head of the fastener. Any attempt at moving the head of the fastener from the securing seat of the slot can result in contact between the locking flange and the head of the securing stud. This contact can prohibit the fastener from being removed from the slot. While the locking bracket can prevent inadvertent disassembly, it can also prevent disassembly when disassembly is intentional, or even required. The prevention of disassembly can also prevent the replacement of individual parts without the replacement of the whole unit. For example, when the locking bracket has been used to join an arm to a chair and the arm is damaged, instead of only replacing the arm, a larger component, or maybe even the entire chair, may have to be replaced.

Accordingly, a need exists in the furniture industry for a bracket for use in a joint assembly that makes disassembly of the furniture parts more difficult but still allows for intentional disassembly when required.

Figure 1B:
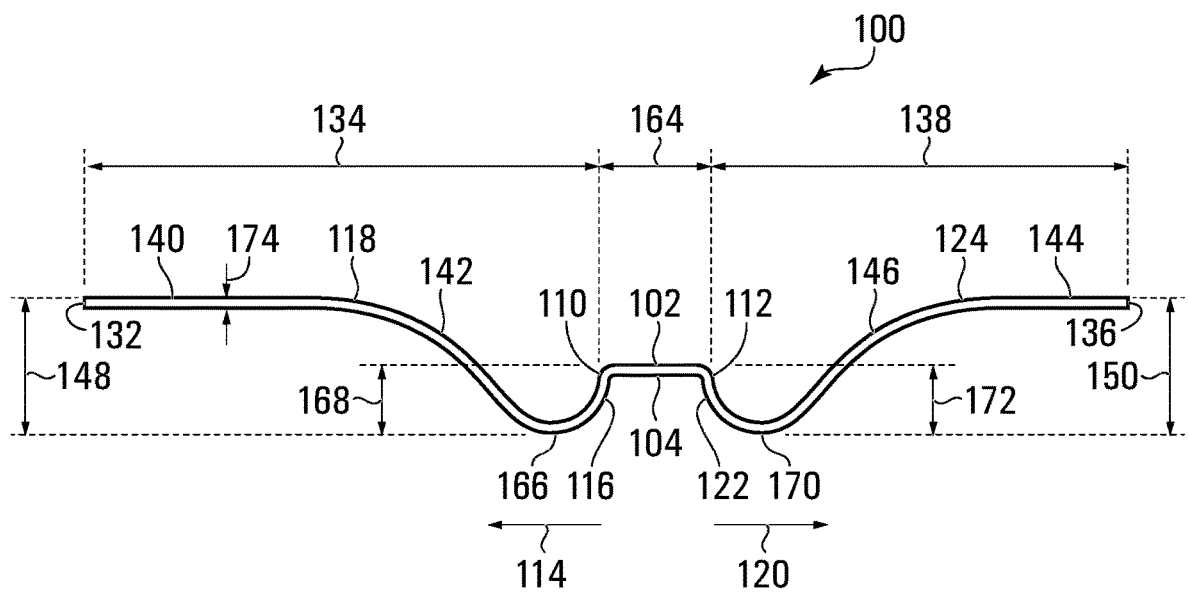
FIG. 1B shows a side plan view of the flexible bracket of FIG. 1A.
Figure 1C:
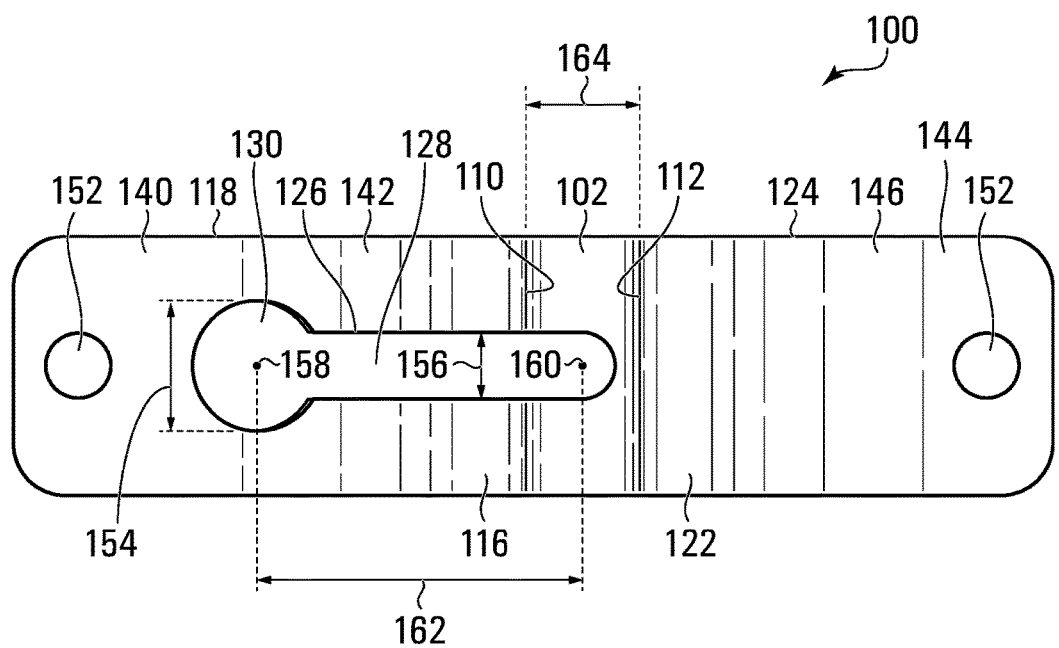
FIG. 1C shows a top plan view of the flexible bracket of FIG. 1A.

Referring now to FIGS. 1A-1C, illustrated therein is a flexible bracket 100, in accordance with an embodiment, for use in forming a joint assembly between two furniture members.

FIG. 1A shows a side perspective view of the flexible bracket 100. The flexible bracket 100 includes a fastener head seat 102 positioned in a plane 104, a first arm 106, and a second arm 108. The fastener head seat 102 includes a first seat end 110 and a second seat end 112 laterally opposed of the first seat end 110. The first arm 106 extends laterally outward of the first seat end 110 of the fastener head seat 102 in a first arm direction 114. The first arm 106 includes a first arm valley portion 116 adjacent the fastener head seat 102 and a first arm distal portion 118 positioned laterally outward the first arm valley portion 116.

The second arm 108 extends laterally outward of the second seat end 112 of the fastener head seat 102 in a second arm direction 120. The second arm 108 can include a second arm valley portion 122 adjacent the fastener head seat 102 and a second arm distal portion 124 laterally outward the second arm valley portion 122.

As shown in FIG. 1B, the first arm direction 114 and the second arm direction 120 are aligned opposite each other. Although it may be convenient to align the first arm direction 114 and the second arm direction 120 as opposites, alternative embodiments (not shown) are possible in which the first arm direction 114 and the second arm direction 120 may not be aligned opposite each other. For example, the first arm direction 114 may be aligned at angle relative to the second arm direction 120. The alignment of the first arm direction 114 and the second arm direction 120 can be determined based on the intended use of the flexible bracket 100.

Referring again to FIG. 1A, the flexible bracket 100 further includes a slotted aperture 126 formed thereon for receiving a head of a headed fastener (not shown). The slotted aperture 126 can include a slot portion 128 and a fastener head receiving portion 130. The slot portion 128 can extend laterally outward in the first arm direction 114 from the fastener head seat 102 to the fastener head receiving portion 130 positioned on the first arm 106.

FIG. 1B shows a side plan view of the flexible bracket 100. The first arm valley portion 116 is disposed below the plane 104 of the fastener head seat 102. The first arm distal portion 118 is disposed above the plane 104 of the fastener head seat 102. That is, the plane 104 of the fastener head seat 102 bisects the first arm valley portion 116 and the first arm distal portion 118. Similarly, the second arm valley portion 122 is disposed below the plane 104 of the fastener head seat 102. The second arm distal portion 124 is disposed above the plane 104 of the fastener head seat 102. That is, the plane 104 of the fastener head seat 102 bisects the second arm valley portion 122 and the second arm distal portion 124.

Referring still to FIG. 1B, a length of the first arm 106 measured along the first arm direction 114 from the first seat end 110 to a first arm outer edge 132 corresponds to a first arm length 134. A length of the second arm 108 measured along the second arm direction 120 from the second seat end 112 to a second arm outer edge 136 corresponds to a second arm length 138. In the flexible bracket 100 shown, the first arm length 134 is longer than the second arm length 138. In an alternative embodiment (not shown), the second arm length 138 may be longer than the first arm length 134. In another alternative embodiment (not shown), the first arm length 134 and the second arm length 138 may be equivalent. In this alternative embodiment, the fastener head seat 102 is centrally positioned in the flexible bracket 100. For example, the first arm length 134 and the second arm length 138 can be in the range of 1.0 to 5.0 inches. In a preferred embodiment, the first arm length 134 and the second arm length 138 can be in the range of 1.2 to 3.0 inches. The preferred first arm length 134 and the second arm length 138 can be determined based on the intended use of the flexible bracket 100.

FIG. 1C shows a top plan view of the flexible bracket 100. The first arm distal portion 116 includes a first arm planar portion 140 and a first arm non-planar portion 142. The first arm non-planar portion 142 connects the first arm valley portion 116 to the first arm planar distal portion 140. Similarly, the second arm distal portion 124 includes a second arm planar portion 144 and a second arm non-planar portion 146. The second arm non-planar portion 146 connects the second arm valley portion 122 to the second arm planar portion 144.

As best shown in FIG. 1B, a distance from the plane 104 of the fastener head seat 102 to the first arm planar portion 140 corresponds to a first arm elevation 148. Similarly, a distance from the plane 104 of the fastener head seat 102 and the second arm planar portion 144 corresponds to a second arm elevation 150. For example, the first arm elevation 148 and the second arm elevation 150 may be between 0.1 and 3.0 inches. In a preferred embodiment, the first arm elevation 148 and the second arm elevation 150 may be between 0.2 and 1.5 inches.

When securing the flexible bracket 100 to a flat surface (not shown), it may be particularly convenient for first arm planar portion 140 and the second arm planar portion 144 to be positioned in the same plane. When the first arm planar portion 140 and the second arm planar portion 144 are positioned in the same plane, the first arm elevation 148 and the second arm elevation 150 may be equivalent (as shown in FIG. 1B). In alternative embodiments (not shown), the first arm elevation 148 and the second arm elevation 150 may be varied independently. This may be necessary when the surface the flexible bracket 100 is being secured to is not flat.

As best shown in FIG. 1C, the first arm distal portion 118 and the second arm distal portion 124 may each include an aperture or a throughhole 152. The throughholes 152 may be useful in the securement of the flexible bracket 100 to a surface (not shown) when using threaded fasteners to secure the flexible bracket 100 to the surface. The throughholes 152 may be positioned along the first arm distal portion 118 and second arm distal portion 124. The throughholes 152 may be positioned on the first arm planar portion 140 and second arm planar portion 144 of the first and second distal portions 118, 124, respectively, to provide flat areas at which the flexible bracket 100 can be secured flush to the surface. In alternative embodiments, the first arm distal portion 118 and the second arm distal portion 124 may be secured to the surface by any one or more of glue, epoxy, threaded screws, and nails.

Referring to FIG. 1C, the fastener head receiving portion 130 of the slotted aperture 126 enables the head of the headed fastener to pass therethrough. Although many variations are possible, it may be convenient for the shape of the fastener head receiving portion 130 to be consistent with the shape of the head of the head fastener. For example, if the head of the headed fastener is square, it may be convenient for the shape of the fastener head receiving portion 130 to be a slightly larger square to permit the head of the headed faster to pass therethrough. As the heads of many headed fasteners are circular, in a preferred embodiment, the fastener head receiving portion 130 may also be circular (as shown in FIG. 1C). In FIG. 1C, a receiving diameter 154 of the fastener head receiving portion 130 is sized larger than a diameter of the head of the headed fastener. For example, the receiving diameter 154 may be between 0.3 and 1.6 inches. In a preferred embodiment, the receiving diameter 154 may be between 0.4 and 1.3 inches.

The slot portion 128 of the slotted aperture 126 enables the head of the headed fastener to slide within the slot portion 128 between the fastener head receiving portion 130 and the fastener head seat 102 without the head of the headed fastener disengaging the slot portion 128. To prevent this disengagement, a slot width 156 of the slot portion 128 is sized smaller than the diameter of the head of the headed fastener. For example, the slot width 156 may between 0.1 and 0.8 inches. In a preferred embodiment, the slot width 156 may be between 0.2 and 0.5 inches, where the diameter of the head of the fastener is 0.3 to 1.2 inches The slot portion 128 extends laterally outward from the second seat end 112 of fastener head seat 102 in the first arm direction 114, passes through the first arm valley portion 116 and continues until reaching the fastener head receiving portion 130. The fastener head receiving portion 130 may be positioned at other locations along the first arm distal portion 118.

As shown in FIG. 1C, the fastener head receiving portion 130 may extend onto the first arm planar portion 140 such that a portion of the fastener head receiving portion 130 may be positioned on both the first arm planar portion 140 and the first arm non-planar portion 142. With this positioning of the fastener head receiving portion 130, it may be easy to insert the head of the headed fastener therethrough for assembly. In other embodiments (not shown), the fastener head receiving portion 130 may be fully positioned on the first arm non-planar portion 142.

A length of the slotted aperture 126 measured from a central point 158 of the fastener head receiving portion 130 to a fastener resting point 160 on the fastener head seat 102 corresponds to a slotted aperture length 162. For example, the slotted aperture length 162 may be between 0.5 and 4.0 inches. In a preferred embodiment, the slotted aperture length 162 may be between 1.0 and 2.5 inches.

Referring still to FIG. 1C, a length measured from the first seat end 110 to the second seat end 112 corresponds to a head seat length 164. For example, the head seat length 164 may be between 0.2 and 1.5 inches. In a preferred embodiment, the head seat length 164 may be between 0.3 and 1.2 inches. The preferred head seat length 164, as will be described later, may be determined based on the diameter of the head of the headed fastener.

As best shown in FIG. 1B, the first arm valley portion 116 and the second arm valley portion 122 may be arcuate. For example, the arcuate first arm valley portion 116 and the arcuate second arm valley portion 122 may have a radius between 0.05 and 0.8 inches. In a preferred embodiment, the arcuate first arm valley portion 116 and the arcuate second arm valley portion 122 may have a radius between 0.1 and 0.5 inches. Although the flexible bracket 100 shows the accurate first arm valley portion 116 and the arcuate second arm valley portion 122 having the same radius, it is possible for the arcuate first arm valley portion 116 to have a different radius than the arcuate second arm valley portion 122.

Notwithstanding that the first arm valley portion 116 and the second arm valley portion 122 are shown as the same shape, the first arm valley portion 116 and the second arm valley portion 122 may each be one of many possible shapes. For example, the first arm valley portion 116 may be arcuate and the second arm valley portion 122 may be triangular. Although many other shapes are possible, it may be convenient for the first arm valley portion 116 to be arcuate to permit smooth sliding of the head of headed fastener in the slot portion 128 of the slotted aperture 126 when passing through the first arm valley portion 116.

As best shown in FIG. 1B, a distance between the plane 104 of the fastener head seat 102 and a first valley bottom point 166 of the first arm valley portion 116 corresponds to a first valley depth 168. Similarly, a distance between the plane 104 of the fastener head seat 102 and a second valley bottom point 170 of the second arm valley portion 116 corresponds to a second valley depth 172. The first valley depth 168 and the second valley depth 172 may be equivalent.

In alternative embodiments (not shown), the first valley depth 168 and the second valley depth 172 may be varied independently according to the structure to which the flexible bracket 100 is to be attached. For example, the first valley depth 168 and the second valley depth 172 may be between 0.05 and 0.8 inches. In an embodiment, first valley depth 168 and the second valley depth 172 may be between 0.1 and 0.5 inches. When the first arm valley portion 116 and the second arm valley portion 122 are arcuate, the first valley depth 168 and the second valley depth 172 may be adjusted by altering the radius of the arcuate first arm valley portion 116 and the arcuate second arm valley portion 122, respectively.

The flexible bracket 100 shown in FIGS. 1A-1C may be made from one continuous piece of material. In a preferred embodiment, the one continuous piece of material can be made of spring steel. In an alternative embodiment, the one continuous piece of material can be made of aluminum. In another alternative embodiment, the one continuous piece of material can be made of any suitable flexible metal alloy. The one continuous piece of material is commonly referred to as a "blank". Suitable stamping or punching techniques can be used to form the slotted aperture 126 and through-holes 152 on the blank. The blank can then be bent by any suitable metal bending techniques. Although it may be convenient to make the flexible bracket from one continuous piece of material, other methods are possible, such as, for example, welding individually formed pieces of metal alloy together. In yet another alternative embodiment, the flexible bracket 100 can be made of any suitable flexible polymer. The flexible bracket 100 may be injection molded into its desired configuration.

As shown in FIG. 1B, the flexible bracket 100 can have a thickness 174. The thickness 174 may depend on the material used to manufacture the flexible bracket 100. The thickness 174 can be selected to allow the flexible bracket 100 to be formed through suitable stamping and bending techniques while also permitting the flexible bracket 100 to resist permanent deformation when force is applied by hand. For example, the thickness 174 may be between 0.01 and 0.08 inches. In a preferred embodiment, the thickness 174 may be between 0.02 and 0.05 inches.

Figure 2:
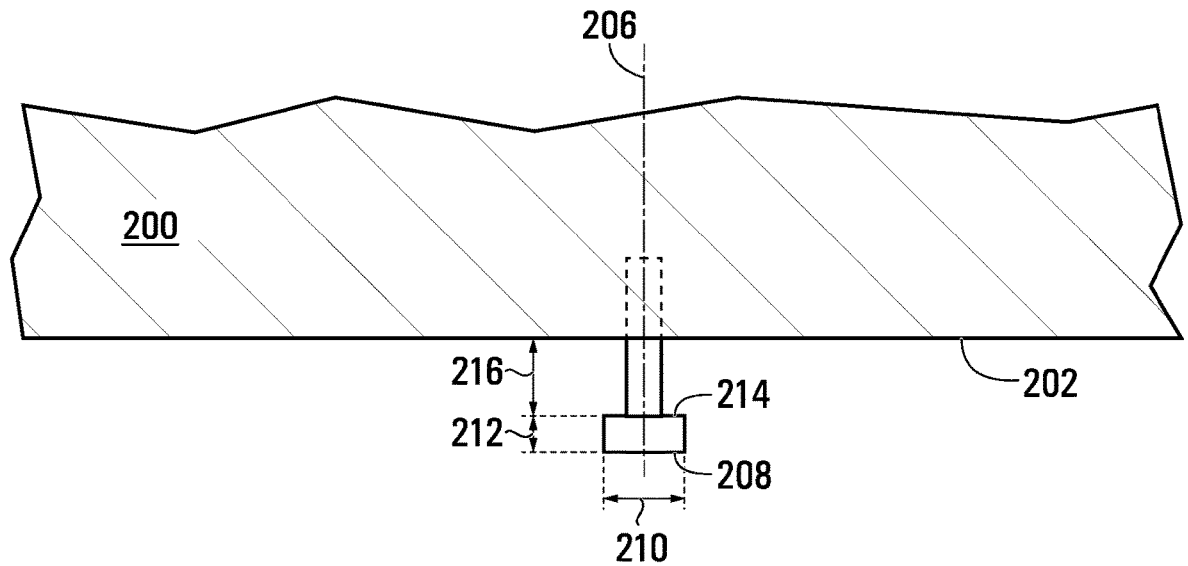
FIG. 2 shows a cross-sectional view of a first member having a headed fastener secured thereto.

FIG. 2 shows a cross-sectional view of a first member 200 having a headed fastener 204 secured thereto. The first member 200 may include a first contacting surface 202. The headed fastener 204 may include a longitudinal axis 206 running through its centre and a head 208 having a head diameter 210 and a head height 212. For example, the head 208 may have a head diameter 210 and a head height 212 between 0.2 and 1.5 inches. In a preferred embodiment, the head diameter 210 and the head height 212 may be between 0.3 and 1.2 inches.

As shown in FIG. 2, the headed fastener 204 can be secured to the first contacting surface 202 such that the longitudinal axis 206 is substantially orthogonal to the first contacting surface 202 and the head 208 is spaced from the first contacting surface 204. A distance measured along the longitudinal axis 206 from the first contacting surface 202 to an underside 214 of the head 208 corresponds to a head separation distance 216. For example, the head separation distance 216 may be between 0.1 and 3.0 inches. In a preferred embodiment, the head separation distance 216 may be between 0.2 and 1.5 inches.

Figure 3:
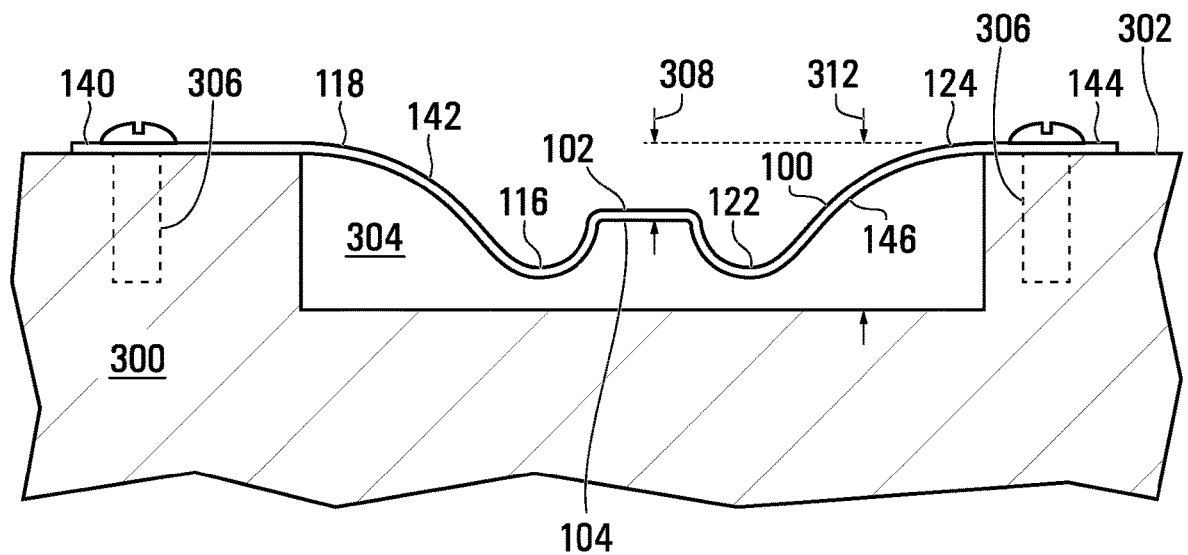
FIG. 3 shows a cross-sectional view of a second member having the flexible bracket depicted in FIGS. 1A through 1C secured thereto.

FIG. 3 shows a cross-sectional view of a second member 300 having the flexible bracket 100 of FIGS. 1A-1C secured thereto. Although the flexible bracket 100 of FIGS. 1A-1C is secured to the second member 300, any of the alternative embodiments of the flexible bracket 100 may be secured to the second member 300. The second member 300 includes a second contacting surface 302. The second contacting surface 302 has a recessed area 304. The flexible bracket 100 is secured to the second contacting surface 302 at the first arm distal portion 118 and the second arm distal portion 124 by positioning the first arm distal portion 118 and the second arm distal portion 124 on opposite sides of the recessed area 304. In this way, that first arm distal portion 118 and the second arm distal portion 124 extend into the recessed area 304 such that first arm valley portion 116, the fastener head seat 102 and the second arm valley portion 122 are contained within the recessed area 304.

As shown in FIG. 3, a distance measured from the plane 104 of the fastener head seat 102 to the second contacting surface 302 corresponds to a seat separation distance 308. The seat separation distance 308 is equal to or greater than the first arm elevation 148 (shown in FIG. 1B). For example, the seat separation distance 308 may be between 0.1 and 3.0 inches. In a preferred embodiment, the seat separation distance 308 may be between 0.2 and 1.5 inches.

The first arm distal portion 118 and the second arm distal portion 124 of the flexible bracket 100 are secured to the second contacting surface 302 of the second member 300 by any one or more of glue, epoxy, threaded screws, and nails. As shown in FIG. 3, the first arm distal portion 118 and the second arm distal portion 124 of the flexible bracket 100 can be secured to the second contacting surface 302 by threaded fasteners 306 that pass through the throughholes 152 (shown on FIG. 1C).

As shown in FIG. 3, the flexible bracket 100 is secured to the second contacting surface 302 at the first arm planar portion 140 and the second arm planer portion 144. With the flexible bracket 100 is secured to the second contacting surface 302 at the first arm planar portion 140 and the second arm planar portion 144, the first arm non-planar portion 142, the first arm valley portion 116, fastener head seat 102, the second arm valley portion 122 and the second arm non-planar portion 146 are contained within the recessed area 304.

Referring still to FIG. 3, a distance measured from the second contacting surface 302 to a bottom recess surface 310 of the recessed area 304 corresponds to a recess depth 312. In order to permit the head of the headed fastener to slide within the slot portion 128 between the fastener head receiving portion 130 and the fastener head seat 102, the recess depth 312 may be greater than or equal to the sum of the seat separation distance 308 (i.e. the first arm elevation 148), the first valley depth 168 and the head height 212 of the head fastener 204. For example, the recess depth 312 may be between 0.35 and 5.3 inches. In a preferred embodiment, the recess depth 312 may be between 0.6 and 3.2 inches.

Figure 4:
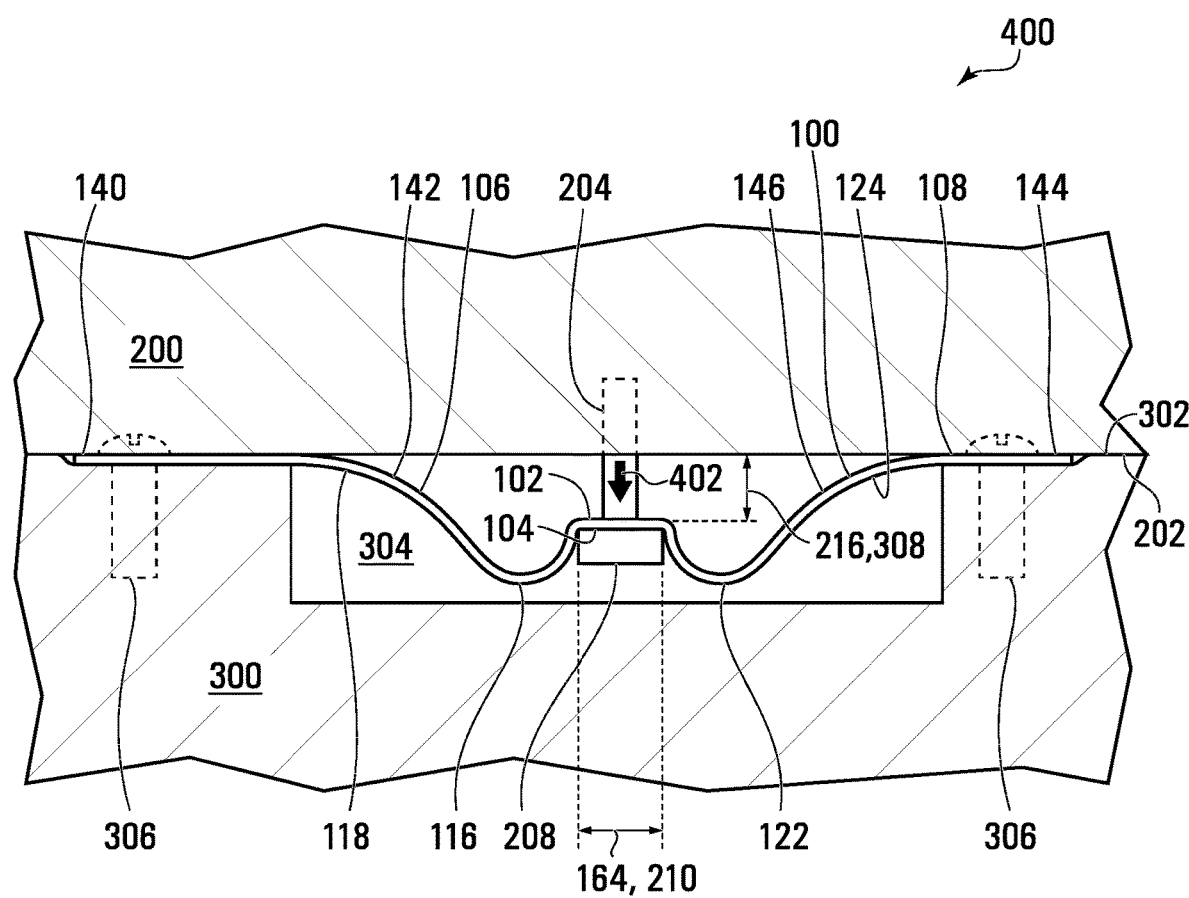
FIG. 4 shows a cross-sectional view of a joint structure assembly with the first member depicted in FIG. 2 joined to the second member depicted in FIG. 3.

Referring to FIG. 4 shows a cross-sectional view of a joint structure assembly 400 with the first member 200 of FIG. 2 joined to the second member 300 of FIG. 3. The first member 200 having the headed fastener 204 secured thereto is moved relative to the second member 300 fitted with the flexible bracket 100. However, an alternative assembly in which the second member 300 fitted with the flexible bracket 100 is moved relative to the first member 200 having the headed fastener 204 secured thereto is also possible.

To join the first member 200 having the headed fastener 204 secured thereto (FIG. 2) with the second member 300 fitted with the flexible bracket 100 (FIG.3), the head 208 of the headed fastener 204 passes through the fastener head receiving portion 130 (FIG. 1C) of the slotted aperture 126 (FIG. 1C). Next, the first member 200 is moved such that the head 208 of the headed 204 slides within the slot portion 128 (FIG. 1C) of the slotted aperture 126 from the fastener head receiving portion 130 to the fastener resting point 160 (FIG. 1C) on the fastener head seat 102 (FIG. 1C). In order to complete this movement from the fastener head receiving portion 130 to the fastener head seat 102, the head 208 of the headed fastener 204 passes through the first arm valley portion 116 which is disposed below the plane 104 of the fastener head seat 102. In a preferred embodiment, when the head 208 of the headed fastener 204 slides within the slot portion 128 towards the fastener head seat 102, the first arm 106 may be pulled toward the first member 200 by the head 208 of the headed fastener 202, allowing the head 204 to pass the first arm valley portion 116 and into the fastener head seat 102.

As shown in FIG. 4, the first member 200 is joined with the second member 300 when the head 208 of the headed fastener 204 is positioned at the fastener head seat 102 within the slot portion 128 (FIG. 1C) of the slotted aperture 126 (FIG. 1C). In this position, the first arm valley portion 116 impedes the head 208 of the headed fastener 204 from sliding within the slot portion 128 toward the fastener head receiving portion 130.

When a force (not shown) is applied to the first member 200 or second member 300 that can ordinarily unjoin the first member 200 from the second member 300, the first arm valley portion 116 impedes the head 208 of the headed fastener 204 from exiting the fastener head seat 102. That is, the first valley portion 116 may assist in keeping the first member 200 joined with the second member 300 when the force is applied to either of the first or second members 200, 300.

Unjoining the first member 200 and the second member 300 can be difficult for an unaided person to perform. Sufficient force must be placed on the first member 200 to move it relative to the second member 300 such that the head 208 of the headed fastener 204 may exit the fastener head seat 102. Preferably, the use of a tool may be needed to move the head 208 of the headed fastener 204 through the first arm valley portion 116 and toward the fastener head receiving portion 130 of the slotted aperture 126. When the force applied is sufficiently strong, contact between the head 208 of the headed fastener 204 and the first arm valley portion 116 may cause the first arm 106 to flex toward the first member 200 allowing the head 208 of the headed fastener 204 to pass the first arm valley portion 116.

Referring still to FIG. 4, in a preferred embodiment of the joint structure assembly 400, the head seat length 164 (FIG. 1C) corresponds to the head diameter 210 of the headed faster 204. In this way, when the head 208 of the headed fastener 204 is positioned at the fastener head seat 102 within the slot portion 128 (FIG. 1C) of the slotted aperture 126 (FIG. 1C), the head 208 is restrained between the first arm valley portion 116 and the second arm valley portion 122. This restraint may further impede movement of the first member 200 relative to the second member 300, stabilizing the connection between the first member 200 and the second member 300.

In a preferred embodiment of the joint structure assembly 400, the head separation distance 216 (FIG. 2) may be shorter than the seat separation distance 308 (FIG. 3). As shown in FIG. 4, when the head 208 is positioned at the fastener head seat 102, the first arm 106 and the second arm 108 of the flexible bracket 100 may be forced to flex toward the first member 200 such that the seat separation distance 308 is reduced to equal to the head separation distance 216. As a result, the position of the fastener head seat 102 when the first and second arms 106, 108 of flexible bracket 100 are flexed, may be offset toward the first member 200 relative to its position when the first and second arms 106, 108 of the flexible bracket 100 are not flexed. The tension in the flexible bracket 100 created by this flexing causes the fastener head seat 102 to exert a holding force 402 to the underside 214 of the head 208 of the headed fastener 204 directed toward the second member 300. The holding force 402 pulls the first member 200 toward the second member 300, further impeding the head 208 of the headed fastener 204 from exiting the fastener heat seat 102.

The holding force 402 can be modified by adjusting head separation distance 216 relative to the seat separation distance 308. For example, if the head separation distance 216 is decreased relative to the seat separation distance 308, the holding force 402 may increase since there may be more tension in the first and second arms 106, 108 of flexible bracket 100 due to greater flexing. The holding force 402 may be increased until a spring tolerance of the flexible bracket 100 is reached. Alternatively, if the head separation distance 216 is increased relative to the seat separation distance 308, the holding force 402 will decrease since there may be less tension in the first and second arms 106, 108 of flexible bracket 100 due to lesser flexing. There may be no holding force 402 when the head separation distance 216 is equal to or larger than the seat separation distance 308.

As shown in FIG. 4, when the first member 200 is joined with the second member 300, the first contacting surface 202 may rest flush with the second contacting surface 302. A flush connection between the first contacting surface 202 and the second contacting surface 302 can provide an aesthetically pleasing, and therefore, desirable joining of the first member 200 and the second member 300.

Although the joint structure assembly 400 shown in FIG. 4 shows the joining of the first member and the second member 300 through the joining of one headed fastener 204 to one flexible bracket 100, other possible joint structure assemblies are possible that employ a plurality of headed fasteners 204 respectively joined with a plurality of flexible brackets 100. For example, a joint structure assembly (not shown) may have a plurality of headed fasteners 204 fitted to the first member 200 that are respectively joined with a plurality of flexible brackets 100 secured to the second member 300. The first member 200 and the second member 300 may be any suitable furniture parts that require joining. For example, the first and second members 200, 300 may be parts of a table, a shelving unit, a desk, a chair, a lamp, a bed frame, etc.

Figure 7:
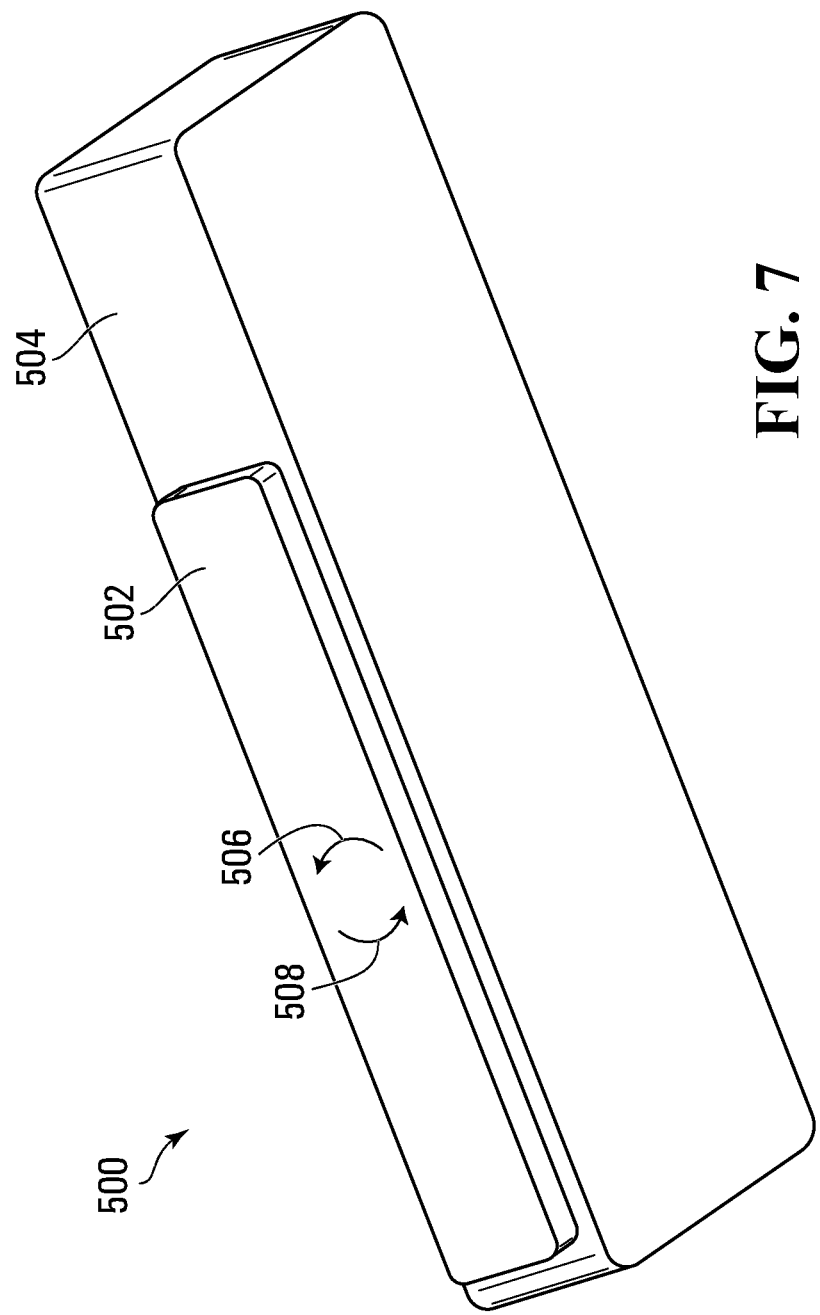
FIG. 7 shows a top perspective view of a joint structure assembly with the arm cap of FIG. 5 joined to the side wall of FIG. 6.

Reference is now made to FIGS. 5-7 that show an example joint structure assembly 500 to join an arm cap 502 to a side wall 504 of an armchair (not shown). The first member 200 is the arm cap 502 and the second member 300 is the side wall 504 of the armchair. FIG. 5 shows a bottom perspective view of the arm cap 502 having two headed fasteners 204 secured thereto. The two headed fasteners are spaced apart a lateral distance 510, the lateral distance 510 being measured between the longitudinal axis 206 of the each headed fastener 204. When secured, the two headed fasteners 204 are oriented in substantially the same direction as one another. That is, the longitudinal axis 206 of the two headed fasteners 204 are substantially parallel to one another.

FIG. 6 shows a top perspective view of the side wall 504 of an armchair having two flexible brackets 100 secured thereto. The two flexible brackets 100 may be secured to the side wall 504 such that the first arm valley portion 116, the fastener head seat 102 and the second arm valley portion 122 of each flexible bracket 100 can be contained within respective recessed areas 304. The two flexible brackets 100 are spaced apart a lateral distance 512, the lateral distance being measured between the fastener resting point 160 (FIG. 1C) of each flexible bracket 100. The lateral distance 512 is set to match the lateral distance 510 between the two headed fasteners 204 secured to the arm cap 502. When secured, the two flexible brackets 100 are oriented such that the slot portion 128 of the slotted aperture 126 (as best shown in FIG. 1C) of the each flexible bracket 100 are substantially in line with one another. That is, the flexible brackets 100 are secured to the side wall 504 such that the slot portion 128 of each flexible bracket 110 is in line.

Referring specifically to FIG. 7 shows a top perspective view of the example joint structure assembly 500 with the arm cap 502 of FIG. 5 joined to the side wall 504 of FIG. 6. The arm cap 502 is joined to the side wall 504 by the respective joining of the two flexible brackets 100 to the two headed fasteners 204. As the two flexible brackets are secured to the side wall 504 in line, the joined arm cap 502 may be prevented from rotating in a clockwise 506 or a counterclockwise 508 direction relative to the side wall 504. Therefore, the arm cap 502 is securely joined to the side wall 504 of the armchair.

While the above description provides examples of one or more apparatus, methods, or systems, it will be appreciated that other apparatus, methods, or systems may be within the scope of the claims as interpreted by one of skill in the art.

The invention claimed is:

1. A joint structure assembly comprising:
  a first member having a first contacting surface;
  a second member having a second contacting surface, the second contacting surface having at least one recessed area;
  at least one headed fastener having a head and a longitudinal axis running through its centre, the at least one headed fastener being secured to the first contacting surface of the first member such that the longitudinal axis is substantially orthogonal to the first contacting surface and the head of the at least one headed fastener is spaced from the first contacting surface;
  at least one flexible bracket for joining the first member to the second member, the at least one flexible bracket being secured to the second contacting surface of the second member, the at least one flexible bracket comprising:
    i) a fastener head seat positioned in a plane, the fastener head seat having a first seat end and a second seat end laterally opposed of the first seat end;
    ii) a first arm extending laterally outward of the first seat end, the first arm having a first arm valley portion adjacent the fastener head seat and a first arm distal portion positioned laterally outward of the first arm valley portion, the first arm valley portion being disposed below the plane of the fastener head seat, the first arm distal portion being disposed above the plane of the fastener head seat;
    iii) a second arm extending laterally outward of the second seat end, the second arm having a second arm valley portion adjacent the fastener head seat and a second arm distal portion laterally outward of the second arm valley portion; and
    iv) a slotted aperture having a slot portion and a fastener head receiving portion, the slot portion extending laterally outward from the fastener head seat to the fastener head receiving portion positioned on the first arm, the fastener head receiving portion being dimensioned to enable the head of the at least one headed fastener to pass therethrough, the slot portion being dimensioned to enable the head of the at least one headed fastener to slide within the slot portion between the fastener head receiving portion and the fastener head seat without disengaging the slot portion,
  wherein the first arm distal portion and the second distal arm portion are secured to the second contacting surface such that first arm valley portion, the fastener head seat and the second arm valley portion are contained within the at least one recessed area of the second contacting surface;
  wherein, the first member is joined with the second member when the head of the at least one headed fastener is positioned at the fastener head seat within the slot portion of the slotted aperture, the first arm valley portion impeding the head of the at least one headed fastener from exiting the fastener head seat.

2. The joint structure assembly of claim 1, wherein
an underside of the head of the at least one headed fastener is spaced from the first contacting surface by a head separation distance;
the plane of the fastener head seat of the at least one flexible bracket is spaced from the second contacting surface by a seat separation distance, the seat separation distance being shorter than the head separation distance such that, when the head of the at least one headed fastener is positioned at the fastener head seat within the slot portion of the slotted aperture, the first and second arms of the at least one flexible bracket are forced to flex toward the first member, the tension in the first and second arms causing the fastener head seat to exert a holding force to the underside of the head of the at least one headed fastener directed toward the second member, the holding force further impeding the head of the at least one headed fastener from exiting the fastener head seat.

3. The joint structure assembly of claim 1, wherein a head seat length between the first seat end and second seat end of the fastener head seat corresponds to a diameter of the head of the at least one headed fastener such that when the head of the at least one headed fastener is positioned at the fastener head seat within the slot portion of the slotted aperture, the head is restrained between the first arm valley portion and the second arm valley portion of the first and second legs, respectively, to impede movement of the first member relative to the second member.

4. The joint structure assembly of claim 1, wherein the first arm distal portion and the second arm distal portion of the at least one flexible bracket are divided into planar and non-planar portions, the first arm non-planar portion connecting the first arm valley portion to the first arm planar portion, the first arm planar portion being parallel to the plane of the fastener head seat, the second arm non-planar portion connecting the second arm valley portion to the second arm planar portion, the second arm planar portion being parallel to the plane of the fastener head seat.

5. The joint structure assembly of claim 4, wherein the first arm planar portion and the second arm planar portion each arm comprise a through hole, the at least one flexible bracket being secured to the second contacting surface of the second member by threaded fasteners passing through the through holes.

6. The joint structure assembly of claim 1, wherein, when the first member is joined with the second member, the first contacting surface is flush with the second contacting surface.

7. The joint structure assembly of claim 1, wherein the first arm valley portion and the second arm valley portion of the at least one flexible bracket are arcuate.

8. The joint structure assembly of claim 1, wherein the first arm distal portion and the second arm distal portion of the at least one flexible bracket are each secured to the second contacting surface of the second member by any one or more of glue, epoxy, threaded screws, and nails.

9. The joint structure assembly of claim 1, wherein the first arm of the at least one flexible bracket extends from the first seat end in a first arm direction and the second arm of the at least one flexible bracket extends from the second seat end in a second arm direction, the first arm direction being opposite the second arm direction.

10. The joint structure assembly of claim 1, wherein the first member is an arm cap of an armchair and the second member is a side wall of the armchair.

11. A flexible bracket for use in forming a joint assembly between two furniture members, the flexible bracket comprising:
a fastener head seat positioned in a plane, the fastener head seat having a first seat end and a second seat end laterally opposed of the first seat end;
a first arm extending laterally outward of the first seat end, the first arm having a first arm valley portion adjacent the fastener head seat and a first arm distal portion positioned laterally outward of the first arm valley portion, the first arm valley portion being disposed below the plane of the fastener head seat, the first arm distal portion being disposed above the plane of the fastener head seat;
a second arm extending laterally outward of the second seat end, the second arm having a second arm valley portion adjacent the fastener head seat and a second arm distal portion laterally outward of the second arm valley portion; and
a slotted aperture for receiving a head of a headed fastener, the slotted aperture having a slot portion and a fastener head receiving portion, the slot portion extending laterally outward from the fastener head seat to the fastener head receiving portion positioned on the first arm, the fastener head receiving portion being dimensioned to enable the head of the headed fastener to pass therethrough, the slot portion being dimensioned to enable the head of the headed fastener to slide within the slot portion between the fastener head receiving portion and the fastener head seat without disengaging the slot portion.

12. The flexible bracket of claim 11, wherein, when the head of the headed fastener is positioned at the fastener head seat within the slot portion of the slotted aperture, the first arm valley portion impedes the head of the headed fastener from exiting the fastener head seat.

13. The flexible bracket of claim 11, wherein, when the head of the headed fastener is positioned at the fastener head seat within the slot portion of the slotted aperture, the first and second arms of the at least one flexible bracket are forced to flex, the tension in the first and second arms of the flexible bracket causing the fastener head seat to exert a holding force to the underside of the head of the headed fastener, the holding force impeding the head of the headed fastener from exiting the fastener head seat.

14. The flexible bracket of claim 11, wherein the first arm distal portion and the second arm distal portion are divided into planar and non-planar portions, the first arm planar portion being parallel to the plane of the fastener head seat, the second arm non-planar portion connecting the second arm valley portion to the second arm planar portion, the second arm planar portion being parallel to the plane of the fastener head seat.

15. The flexible bracket of claim 14, wherein the fastener head receiving portion of the slotted aperture extends onto the first arm planar portion.

16. The flexible bracket of claim 14, wherein a first arm elevation measured from the first arm planar to the plane of the fastener head seat in a direction orthogonal to the plane is equal to a second arm elevation measured from the second arm planar portion to the plane of the fastener head seat in a direction orthogonal to the plane.

17. The flexible bracket of claim 16, wherein the first arm planar portion and the second arm planar portion each comprise a through hole.

18. The flexible bracket of claim 11, wherein the first seat end and the second seat end are laterally spaced apart by a head seat length, the head seat length corresponding to a diameter of the head of the headed fastener.

19. The flexible bracket of claim 11, wherein the first arm valley portion and the second arm valley portion are arcuate.

20. The flexible bracket of claim 11, wherein the first arm extends from the first seat end in a first arm direction and the second arm extends from the second seat end in a second arm direction, the first arm direction being opposite the second arm direction.

\* \* \* \* \*